United States Patent [19]
Ochiai et al.

[11] 3,890,309
[45] June 17, 1975

[54] CEPHALOSPORIN DERIVATIVES

[75] Inventors: Michihiko Ochiai, Suita; Osami Aki, Kawanishi; Akira Morimoto, Suita; Taiiti Okada, Kyoto; Katsutada Masuda, Ashiya, all of Japan

[73] Assignee: Takeda Chemical Industries, Ltd., Japan

[22] Filed: July 12, 1972

[21] Appl. No.: 270,985

[30] Foreign Application Priority Data
July 12, 1971 Japan.................................. 46-51912
Mar. 9, 1972 Japan................................. 47-24305

[52] U.S. Cl............................. 260/243 C; 424/246
[51] Int. Cl............................................ C07d 99/24
[58] Field of Search............................... 260/243 C

[56] References Cited
UNITED STATES PATENTS

| | | | |
|---|---|---|---|
| 3,646,023 | 2/1972 | Bickel et al. | 260/243 C |
| 3,647,788 | 3/1972 | Clark et al. | 260/243 C |
| 3,686,172 | 8/1972 | Bickel et al. | 260/243 C |
| 3,719,673 | 3/1973 | Bickel et al. | 260/243 C |

Primary Examiner—Nicholas S. Rizzo
Attorney, Agent, or Firm—Craig & Antonelli

[57] ABSTRACT

New cephalosporin derivatives of the formula,

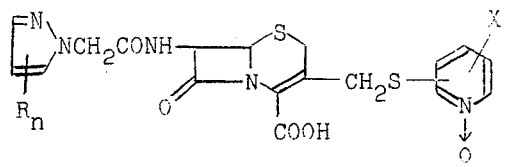

wherein R represents the same or different substituent selected from halogen atom, nitro group, lower alkyl group, amino group or carboxylic group, $n$ is an integer from 0 to 3 and X represents hydrogen or halogen atom. These compounds are remarkably effective for inhibiting the growth of a broad range of microorganisms including *Proteus morganii* and *Mycobacterium tuberculosis*. Examples thereof include 7-(1'-pyrazolylacetamido)-3-(2''-pyridylthiomethyl)-3-cephem-4-carboxylic acid 1''-oxide, 7-(4'-nitro-1'-pyrazolylacetamido)-3-(2''-pyridylthiomethyl)-3-cephem-4-carboxylic acid 1''-oxide, 7-(4'-chloro-1'-pyrazolylacetamido)-3-(2''-pyridylthiomethyl)-3-cephem-4-carboxylic acid 1''-oxide, 7-(3',5'-dimethyl-1'-pyrazolylacetamido)-3-(2''-pyridylthiomethyl)-3-cephem-4-carboxylic acid 1''-oxide and 7-(1-pyrazolylacetamido)-3-(4'-chloro-2'-pyridylthiomethyl)-3-cephem-4-carboxylic acid 1'-oxide.

32 Claims, No Drawings

CEPHALOSPORIN DERIVATIVES

This invention relates to novel cephalosporin compounds and preparation thereof. More particularly, this invention relates to cephalosporin compounds of the formula:

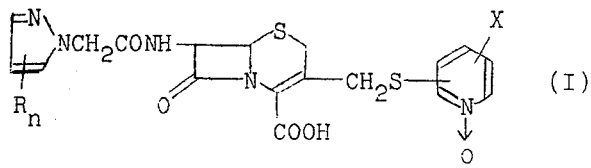

wherein R represents the same or different substituent selected from halogen atom, nitro group, lower alkyl group, amino group or carboxylic group, $n$ is an integer from 0 to 3 and X represents hydrogen or halogen atom, or salts thereof and also to a process for producing them.

There have heretofore been known many cephalosporin compounds derived from cephalosporin C, by converting the 5-amino-5-carboxyvaleryl group at the 7-position of cephalosporin C into various acyl groups and/or by converting the acetoxy group at the 3-position into hydrogen, alkoxy group, substituted thio group, quaternary ammonium group, etc. However, there have been known no such cephalosporin compounds that are effective against *Proteus morganii*, a kind of pathogenic microorganisms causing urinary tract infectious disease, or *Mycobacterium tuberculosis*.

It was discovered that the cephalosporin compounds of the formula (I) have a strong antibiotic action not only against *Proteus morganii*, to which the known cephalosporin and penicillin derivatives are ineffective, but also against a broad range of bacteria including *Mycobacterium tuberculosis*.

The cephalosporin derivatives and salts thereof may be prepared by the per se known methods. For example, they may be produced by allowing the cephalosporanic acids represented by the following formula:

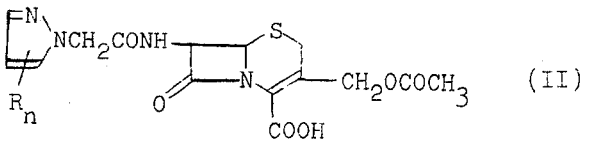

wherein R and $n$ are as defined above, or salts thereof to react with pyridinethiol N-oxide compounds represented by the following formula:

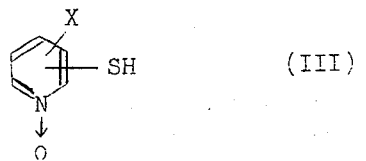

wherein X is as defined above, or salts thereof. Alternatively, they may be produced by the reaction between 7-aminocephalosporin derivatives represented by the following formula:

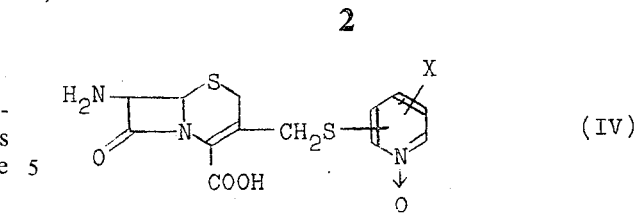

wherein X is as defined above, or salts thereof and pyrazolylacetic acids represented by the following formula:

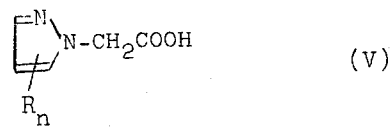

wherein R and $n$ are as defined above, or functional derivatives at the carboxylic group thereof.

In the former method, 3-pyridylthiomethylcephalosporin derivatives (I) are obtained by reacting pyridinethiol N-oxide compounds (III) with cephalosporanic acids (II), which may be produced, for example, by reacting corresponding pyrazolyl acetic acids (V) or their functional derivatives at the carboxylic group with 7-aminocephalosporanic acids. In the pyrazolyl acetic acids (V), R represents halogen atoms such as chlorine, bromine, etc., amino groups, lower alkyl groups such as methyl, ethyl, isopropyl, butyl group, etc., or carboxylic group. In case where R is lower alkyl group, it may further be substituted with hydroxy group, nitro group, amino group, halogen atom, carboxylic group or the like. When R is carboxylic group, it may be replaced by amide, substituted amide (lower alkyl or acyl substituent etc), or ester (alkyl, benzyl or the like). Any substituents which interfere with the acylation reaction are suitably protected during the reaction. The acyl group in the formula (I) is, for example, 1-pyrazolylacetyl, 3,-5-dimethyl-1-pyrazolylacetyl, 4-chloro-1-pyrazolylacetyl, 4-nitropyrazolylacetyl, 4-amino-1-pyrazolylacetyl, 4-hydroxymethyl-1-pyrazolylacetyl, 4-methyl-1-pyrazolylacetyl or the like. As the other starting materials (III), those wherein X is hydrogen or halogen atom, such as chlorine, bromine, fluorine, etc. are to be used.

This reaction is preferably conducted in a solvent or solvent mixture. The solvent may be water, heavy water or any organic solvent which is easily miscible with water and inert to the starting materials. For example, dimethylformamide, dimethylacetamide, dioxane, acetone, alcohol, acetonitrile, dimethylsulfoxide, tetrahydrofuran or the like may preferably be used as the organic solvent. The reaction temperature and time may vary with the starting compounds, their ratios and the solvents to be used. The reaction is usually conducted at a temperature ranging from 0° to 100°C for several hours to several days. The reaction is conducted at a pH of 2 to 8, more preferably 5 to 8. To prevent oxidation of pyridinethiol N-oxide, one of the starting materials, the reaction may preferably be conducted in an atmosphere of an inert gas such as nitrogen. Purification of the reaction products may be conducted according to conventional methods, including column chromatography, extraction, precipitation, countercurrent distribution, recrystallization, etc.

In the alternative method for the preparation of 3-pyridylthiomethylcephalosporin derivatives (I), 7-aminocephalosporin derivatives (IV) are reacted with pyrazolyl acetic acids (V) or their functional derivatives at the carboxylic group. The pyrazolyl acetic acids (V) used in this reaction may include 1-pyrazolyl acetic acid, 3,5-dimethyl-1-pyrazolyl acetic acid, 4-chloro-1-pyrazolyl acetic acid, 4-nitro-1-pyrazolyl acetic acid, 4-methyl-1-pyrazolyl acetic acid and the like. On the other hand, the compounds (IV) may be derived from 7-amino or acylamino cephalosporanic acids by the reaction of pyridinethiol N-oxide compounds (III) and deacylating the reaction produce, if necessary (see Belgian Pat. No. 770,804). The compounds (IV) may include 7-amino-3-(2'-pyridylthiomethyl)-3-cephem-4-carboxylic acid 1'-oxide, 7-amino-3-(4'-chloro-2'-pyridylthiomethyl)-3-cephem-4-carboxylic acid 1'-oxide, 7-amino-3-(4'-pyridylthiomethyl)-3-cephem-4-carboxylic acid 1'-oxide and the like. The carboxylic acid at the 4-position may be in the free form, in the form of salts with sodium, potassium triethylamine, etc., or in the form of esters with benzyl, $\beta$-methylsulfonylethyl, benzhydryl, trimethylsilyl, etc.

The pyrazolylacetic acids used for acylation reaction may be in the free form, in the form of salts with sodium, potassium, calcium, trimethylamine, pyridine, etc., or their functional derivatives such as acid halides, acid anhydrides, mixed acid anhydrides, active amides, active esters or the like. Among which acid chlorides, alkyl carbonate anhydrides, mixed aliphatic carboxylic acid anhydrides, acid azorides are most frequently used. When the pyrazolylacetic acids (V) are used in the free form or in the form of salts, suitable condensing agents are used, for example, N,N'-disubstituted carbodiimides such as N,N'-dicyclohexyl carbodiimide, azolide compounds such as N,N'-carbonylimidazole, N,N'-thionyldiimidazole, dehydrating agents such as N-ethoxycarbonyl-2-ethoxy-1,2-dihydroquinoline, oxyphosphorous chloride, alkoxy acetylene, etc. Use of such condensing agents as above in the reaction, is considered to cause desired acylation via reactive derivatives of the pyrazolylacetic acids (V).

This acylation reaction can advantageously and smoothly be conducted in a solvent. The solvent may be any common solvent or solvent mixture so long as it does not interfere with the reaction of the present invention. It includes water, acetone, tetrahydrofuran, dioxane, acetonitrile, chloroform, dichloromethane, dichloroethylene, pyridine, dimethylaniline, dimethylformamide, dimethylacetamide, dimethylsulfoxide, and the like. The reaction is usually carried out under cooling or at a room temperature. Purification of the reaction products may be conducted by column chromatography, extraction, isoelectric point precipitation, countercurrent distribution, recrystallization or the like.

The cephalosporin compounds according to the present invention may also be in the form of salts with sodium, potassium, magnesium, calcium, aluminum, ammonium, triethylamine, etc.

The thus obtained cephalosporin derivatives (I) can be used in like manner as in the known cephalosporin preparations. They possess strong antibiotic activity to a broad range of microorganisms including *Proteus morganii* and *Mycobacterium tuberculosis*, to which known cephalosporins are substantially ineffective, and are greatly useful as medicaments.

The cephalosporin compounds (I) of the present invention are generally administered orally as well as in an injectable form, etc. in like manner as in the known cephalosporin preparations, but their dosage, dose form, etc. vary with their substituent groups at the 3-position and acyl groups at the 7-position. For example, the effective dose of sodium 7-(1'-pyrazolylacetamido)-3-(2'-pyridylthiomethyl)-3-cephem-4-carboxylate 1''-oxide is about 0.25 g to 1 g every 4 to 6 hours for an adult human.

It is to be understood that the following examples are solely for the purpose of illustration and not to be construed as limitations of this invention, and that many variations may be resorted to without departing from the spirit and scope of this invention. In this specification, "g.", "mg.", "ml.", "mcg.", "m.p." and "decomp." are "gram", "milligram", "milliliter", "microgram", "melting point" and "decomposed", respectively. Temperatures are all uncorrected, and percentages are all on the weight basis.

EXAMPLE 1

761 Milligrams of 7-(1'-pyrazolylacetamido)-cephalosporanic acid, 168 mg. of sodium hydrogen carbonate and 400 mg. of sodium 2-pyridinethiol N-oxide were dissolved in 20 ml. of water. The aqueous solution was stirred at 50°C for 40 hours. Precipitating insoluble materials were filtered off from the reaction mixture. The filtrate was passed columnwise over polystyrene resin (Amberlite XAD-II, Trade name of Rohm & Haas Co.) by the use of water as developer. 480 mg of sodium 7-(1'-pyrazolylacetamido)-3-(2''-pyridylthiomethyl)-3-cephem-4-carboxylate 1''-oxide was obtained. The NMR spectrum (in heavy water, 100 Mc) exhibits a quartet at 3.75 ppm (methylene protons at 2-position); a quartet at 4.32 ppm (methylene protons at 3-position); two doublets at 5.23 and 5.81 ppm, respectively ($J_{6-7}$ = 4 cps) (protons at 6- and 7-positions); a multiplet at 6.59 ppm (proton at 4-position on pyrazole ring); and a multiplet at 7.40 to 8.50 ppm (protons on pyridine ring).

The minimum concentrations (mcg./ml.) of this compound for inhibiting the growth of microorganisms were found to be as follows:

| | |
|---|---|
| *Staphylococcus aureus* | 0.1 |
| *Bacillus subtilis* | 0.5 |
| *Mycobacterium tuberculosis* | 3.125 |

EXAMPLE 2

465 Milligrams of sodium 7-(4'-nitro-pyrazolylacetamido)cephalosporanate and 225 mg. of sodium salt of 2-pyridinethiol N-oxide were dissolved in 7 ml. of water. The aqueous solution was stirred at 50°C for 24 hours. The reaction mixture was treated similarly as in Example 1 to obtain 370 mg. of sodium salt of 7-(4'-nitro-1'-pyrazolylacetamido)-3-(2''-pyridylthiomethyl)-3-cephem-4-carboxylate 1''-oxide.

Elementary analysis:

Calculated for $C_{18}H_{15}O_7N_6S_2Na.2H_2O$:
C, 39.27; H, 3.47; N, 15.21
Found: C, 39.36; H, 3.86; N, 15.14

The NMR spectrum of the present product (in heavy water, 100 Mc) exhibits a quartet at 3.69 ppm (methylene protons at 2-positions); a quartet at 4.26 ppm (methylene protons at 3-position); two doublets at 5.20 and 5.78 ppm, respectively (protons at 6- and 7-positions); two singlets at 8.35 and 8.74 ppm, respectively (protons on the pyrazole ring); and multiplets at 7.30 to 8.42 ppm (protons on the pyridine ring).

The minimum concentrations (mcg./ml.) of this compound for inhibiting the growth of microorganisms were found to be as follows:

| | |
|---|---|
| Staphylococcus aureus | 0.5 |
| Bacillus subtilis | 0.05 |

EXAMPLE 3

3.2 Grams of 4-chloro-1-pyrazolyl acetic acid and 2.5 ml. of triethylamine were dissolved in 30 ml. of dry tetrahydrofuran. To this solution was added at −10°C 3.3 g. of isobutyl chlorocarbonate dissolved in 10 ml. of dry tetrahydrofuran. The mixture solution was stirred at a temperature ranging from −6° to −10°C for 1 hour and then at room temperature for 2 hours. The thus obtained solution of mixed anhydrides was added to the solution which had been prepared by dissolving 2.2 g. of 7-amino-3-(2'-pyridylthiomethyl)3-cephem-4-carboxylic acid 1'-oxide in 30 ml of dimethylacetamide. The mixture solution was stirred at room temperature for 2 hours. Most part of the solvent was distilled off from the reaction mixture under reduced pressure. The residues was shaken with a mixture of ethyl acetate and a 5% aqueous sodium hydrogen carbonate solution, then the aqueous layer was separated. The aqueous layer was passed columnwise over polystyrene resin (Amberlite XAD-II, Trade name of Rohm & Haas Co.) whereby the endproduct was adsorbed on the resin. The column was developed with water to give 1.1 g. of sodium salt of 7-(4'-chloro-1'-pyrazolylacetamide)-3-(2''-pyridylthiomethyl)-3-cephem-4-carboxylic acid 1''-oxide.

Elementary analysis:
    Calculated for $C_{18}H_{15}N_5O_5S_2ClNa.2\frac{1}{2} H_2O$:
        C, 39.38; H, 3.67
    Found:    C, 39.48; H, 3.34

The NMR spectrum of this product (in heavy water, 100 Mc) exhibits a quartet at 3.79 ppm (methylene protons at 2-position); a quartet at 4.37 ppm (methylene protons at 3-position); two doublets at 5.28 and 5.86 ppm, respectively (protons at 6- and 7-positions); and a multiplet at 7.40 to 8.60 ppm (protons on pyridine ring).

The minimum concentration of the present product for inhibiting the growth of Staphylococcus aureus was found to be 0.1 mcg./ml.

EXAMPLE 4

One Gram of 7-(3',5'-dimethyl-1'-pyrazolylacetamido)cephalosporanic acid, 0.206 g. of sodium hydrogen carbonate and 0.550 g. of sodium salt of 2-pyridinethiol N-oxide were dissolved in 10 ml. of water. The aqueous solution was stirred at 50°C for 21.5 hours. The reaction mixture was treated in the same manner as in Example 1 to obtain 656 mg. of sodium 7-(3',5'-dimethyl-1'-pyrazolylacetamido)-3-(2''-pyridylthiomethyl)-3-cephem-4-carboxylate 1''-oxide.

Elementary analysis:
    Calculated for $C_{20}H_{20}N_5O_5S_2Na.3H_2O$:
        C, 43.77; H, 4.96; N, 12.12
    Found:    C, 43.81; H, 5.20; N, 12.19

The NMR spectrum of the present product (in heavy water, 100 Mc) exhibits two singlets at 1.36 and 1.40 ppm, respectively (methyl protons at 3- and 5-positions on pyrazole ring); a quartet at 4.32 ppm (methylene protons at 2-position); two doublets at 5.24 and 5.80 ppm, respectively (protons at 6- and 7-positions); and a multiplet at 7.50 to 8.50 ppm (protons on pyridine ring).

The minimum concentration of the present product (mcg./ml.) for inhibiting the growth of microorganisms was found as follows:

| | |
|---|---|
| Staphylococcus aureus | 0.1 |
| Bacillus subtilis | 0.2 |
| Mycobacterium tuberculosis | 6.25 |

EXAMPLE 5

2.52 Grams of 1-pyrazolyl acetic acid and 2.5 ml. of triethylamine were dissolved in 30 ml. of dry tetrahydrofuran. To this solution was added at −10°C a solution of 3.26 g. of isobutyl chlorocarbonate dissolved in 10 ml. of dry tetrahydrofuran. The solution was stirred at a temperature ranging from −6° to −10°C for 1 hour and then at a room temperature for 2 hours. The thus obtained solution of mixed anhydrides was added into a solution which had been prepared by dissolving 2.2 g. of 7-amino-3-(2'-pyridylthiomethyl)-3-cephem-4-carboxylic acid 1'-oxide in 30 ml. of dimethylacetamide. The mixture was stirred at a room temperature for 2.5 hours. The reaction mixture was treated similarly as in Example 3 to obtain 0.9 g. of sodium 7-(1'-pyrazolylacetamido)-3-(2''-pyridylthiomethyl)-3-cephem-4-carboxylate 1''-oxide. This product was identified to be the same as that obtained in Example 1.

EXAMPLE 6

3.08 Grams of 3,5-dimethyl-1-pyrazolyl acetic acid and 2.5 ml. of triethylamine were dissolved in 30 ml. of tetrahydrofuran. To this solution was added at −10°C a solution of 2.64 g. pivaloyl chloride dissolved in 10 ml. of dry tetrahydrofuran. The solution was stirred at a temperature ranging from −5° to −10°C for 1 hour and then at a room temperature for 2 hours. The thus obtained mixed anhydride solution was added into a solution of 2.2 g. of 7-amino-3-(2'-pyridylthiomethyl)-3-cephem-4-carboxylic acid 1'-oxide dissolved in 30 ml. of dimethylacetamide. The mixture was stirred at room temperature for 2.5 hours. The reaction mixture was treated similarly as in Example 3 to obtain 1.0 g. of sodium 7-(3',5'-dimethyl-1'-pyrazolylacetamido)-3-(2''-pyridylthiomethyl)-3-cephem-4-carboxylate 1''-oxide. This product was identified to be the same as that obtained in Example 4.

EXAMPLE 7

The same procedure as in Example 3 was effected employing 3.42 g. of 4-nitro-1-pyrazolyl acetic acid, 2.5 ml. of triethylamine, 3.26 g. of isobutyl chlorocarbonate and 2.2 g. of 7-amino-3-(2'-pyridylthiomethyl)-3-cephem-4-carboxylic acid 1'-oxide, whereby 0.9 g. of sodium 7-(4'-nitro-1'-pyrazolylacetamido)-3-(2''-pyridylthiomethyl)-3-cephem-4-carboxylate 1''-oxide was obtained. This product was identified to be the same as that obtained in Example 2.

EXAMPLE 8

400 Milligrams of 7-(1-pyrazolylacetamido)cephalosporanic acid and 90 mg. of sodium hydrogen carbonate were dissolved in 10 ml. of water. To this solution was further added 200 mg. of sodium salt of 4-chloro-2-pyridinethiol N-oxide. The mixture was stirred at 50°C for 40 hours. Precipitating insoluble substances were filtered off from the reaction mixture. The filtrate was passed columnwise over polystyrene resin (Amberlite XAD-II, Trade name of Rohm & Haas Co.), whereby the desired product was adsorbed on the resin. The column was developed with a 5% ethanol to give 53 mg. of sodium 7-(1-pyrazolylacetamido)-3-(4'-chloro-2'-pyridylthiomethyl)-3-cephem-4-carboxylate 1'-oxide. The melting point of this product was observed at 166° to 169°C (decomp.). IR spectrum (KBr pellet) of this product showed an absorption of β-lactam at 1745 cm$^{-1}$. NMR spectrum of this product (in heavy water, 100 Mc) exhibits an AB-type quartet at 3.65 ppm (methylene protons at 2-position); an AB-type quartet at 4.21 ppm (methylene protons at 3-position); and two doublets at 5.15 and 5.71 ppm, respectively (protons at 6- and 7-positions).

What we claim is:

1. A compound of the formula,

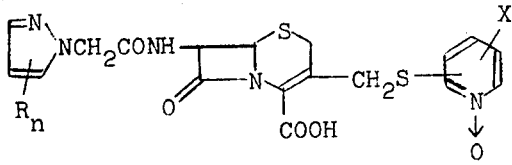

wherein R represents the same or different substituent selected from halogen atom, nitro group, lower alkyl group, amino group or carboxyl group, n is an integer from 0 to 3 and X represents hydrogen or halogen atom, or a pharmaceutically acceptable salt thereof.

2. A compound according to claim 1, wherein the substituent group at the 3-position is 2-pyridylthiomethyl N-oxide.

3. A compound as claimed in claim 2, namely 7-(1'-pyrazolylacetamido)-3-(2''-pyridylthiomethyl)-3-cephem-4-carboxylic acid 1'''-oxide.

4. A compound as claimed in claim 2, namely 7-(4'-nitro-1'-pyrazolylacetamido)-3-(2''-pyridylthiomethyl)-3-cephem-4-carboxylic acid 1''-oxide.

5. A compound as claimed in claim 2, namely 7-(4'-chloro-1'-pyrazolylacetamido)-3-(2''-pyridylthiomethyl)-3-cephem-4-carboxylic acid 1''-oxide.

6. A compound as claimed in claim 2, namely 7-(3',5'-dimethyl-1'-pyrazolylacetamido)-3-(2''-pyridylthiomethyl)-3-cephem-4-carboxylic acid 1''-oxide.

7. A compound as claimed in claim 1, namely 7-(1-pyrazolylacetamido)-3-(4'-chloro-2'-pyridylthiomethyl)-3-cephem-4-carboxylic acid 1'-oxide.

8. A compound according to claim 1, wherein R represents the same or different substituent selected from chlorine, bromine, nitro group, lower alkyl group, amino group or carboxyl group, and further wherein X represents hydrogen, chlorine, bromine or fluorine.

9. A compound according to claim 8, wherein R represents the same or different substituent selected from chlorine, nitro group, lower alkyl group, amino group or carboxyl group, and further wherein X represents hydrogen or chlorine.

10. A compound of the formula

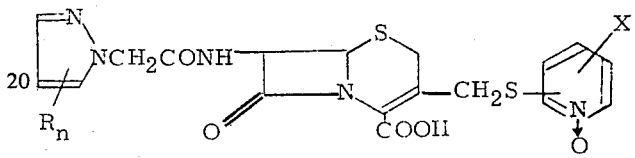

wherein R represents the same or different substituent selected from halogen atom, an amino group, lower alkyl having 1 to 4 carbon atoms, a carboxyl group, a substituted lower alkyl group substituted with a hydroxy group, nitro group, amino group, halogen atom or carboxyl group, and an amine, n is an interger from 0 to 3 and X represents hydrogen or halogen, or a pharmaceutically acceptable salt thereof.

11. A compound according to claim 10, wherein said compound is a salt having a cation selected from the group consisting of sodium, potassium, magnesium, calcium, aluminum, ammonium, and triethylamine.

12. A compound according to claim 10, wherein R represents chlorine or bromine.

13. A compound according to claim 10, wherein R represents an amino group.

14. A compound according to claim 1, wherein R represents a lower alkyl group having from 1 to 4 carbon atoms.

15. A compound according to claim 10, wherein R represents a substituted lower alkyl group substituted with a member selected from the group consisting of hydroxy, nitro, amino, halogen and carboxyl.

16. A compound according to claim 10, wherein R represents a carboxyl group.

17. A compound according to claim 10, wherein R represents amide.

18. A compound according to claim 10, wherein X represents hydrogen.

19. A compound according to claim 10, wherein X represents a halogen atom selected from chlorine, bromine and fluorine.

20. A compound according to claim 1, namely 7-(1'-pyrazolylacetamido)-3-(2''-pyridylthiomethyl)-3-cephem-4-carboxylate 1''-oxide.

21. A compound according to claim 1, namely sodium of 7-(4'-nitro-1'-pyrazolylacetamido)-3-(2''-pyridylthiomethyl)-3-cephem-4-carboxylate 1''-oxide.

22. A compound according to claim 1, namely sodium 7-(4'-chloro-1'-pyrazolylacetamido)-3-(2''-pyridylthiomethyl)-3-cephem-4-carboxylic acid 1''-oxide.

23. A compound according to claim 1, namely sodium 7-(3',5'-dimethyl-1'-pyrazolylacetamido)-3-(2''- pyridylthiomethyl)-3-cephem-4-carboxylate 1''-oxide.

24. A compound according to claim 1, wherein R represents the same or different substituent selected from chlorine, bromine, a nitro group, an amino group or a carboxyl group, and wherein X represents hydrogen, chlorine, bromine, or fluorine.

25. A compound according to claim 24, wherein R represents chlorine.

26. A compound according to claim 24, wherein X represents chlorine.

27. A compound according to claim 1, wherein the acyl group in the formula is 1-pyrazolyl-acetyl, 3,5-dimethyl-1-pyrazolylacetyl, 4-chloro-1-pyrazolylacetyl, 4-nitropyrazolylacetyl, 4-amino-1-pyrazolylacetyl, 4-hydroxymethyl-1-pyrazolylacetyl and 4-methyl-1-pyrazolylacetyl.

28. A compound according to claim 10, wherein R represents the same or different substituent selected from chlorine, bromine, an amino group, methyl, a carboxyl group, and an amide and wherein X represents hydrogen, chlorine, bromine or fluorine.

29. A compound according to claim 10, wherein R represents the same or different substituent selected from the group consisting of chlorine, bromine, an amino group, lower alkyl having 1 to 4 carbon atoms, a carboxyl group, a substituted lower alkyl group substituted with a hydroxy group, nitro group, amino group, halogen atom or carboxyl group, and an amide, and further wherein X represents hydrogen, chlorine, bromine or fluorine.

30. A compound according to claim 29, wherein said substituted lower alkyl group is substituted with a hydroxy group, a nitro group, an amino group, or a carboxyl group.

31. A compound according to claim 29, wherein R represents the same or different substituents selected from the group consisting of chlorine, bromine, an amino group, lower alkyl, a carboxyl group, an amide, and a substituted lower alkyl group substituted with a hydroxy group, a nitro group, an amino group, or a carboxyl group, and further wherein X represents hydrogen, chlorine, bromine, or fluorine.

32. A compound according to claim 31, wherein said lower alkyl groups have from 1-4 carbon atoms.

* * * * *